US007124940B2

(12) United States Patent
Som

(10) Patent No.: US 7,124,940 B2
(45) Date of Patent: Oct. 24, 2006

(54) BURDEN FREE SHOPPING

(76) Inventor: Kamales Som, 1560 E. Edinger, Suite A 1, Santa Ana, CA (US) 92705

( * ) Notice: Subject to any disclaimer, the term of this patent is extended or adjusted under 35 U.S.C. 154(b) by 93 days.

(21) Appl. No.: 10/997,285

(22) Filed: Nov. 24, 2004

(65) Prior Publication Data

US 2006/0108419 A1    May 25, 2006

(51) Int. Cl.
*G06K 15/00* (2006.01)
(52) U.S. Cl. ............................. 235/383; 705/26; 186/52
(58) Field of Classification Search ................ 235/383, 235/472.01, 462.01; 186/52, 55, 56; 705/16, 705/26
See application file for complete search history.

(56) References Cited

U.S. PATENT DOCUMENTS

| 5,047,614 | A | | 9/1991 | Bianco |
| 5,051,565 | A | | 9/1991 | Wolfram |
| 5,158,155 | A | * | 10/1992 | Domain et al. ................ 186/53 |
| 5,168,961 | A | | 12/1992 | Schneider |
| 5,186,281 | A | * | 2/1993 | Jenkins ......................... 186/55 |
| 5,408,077 | A | | 4/1995 | Campo et al. |
| 5,595,264 | A | * | 1/1997 | Trotta, Jr. ..................... 186/56 |
| 5,774,053 | A | * | 6/1998 | Porter ....................... 340/568.1 |
| 5,933,814 | A | * | 8/1999 | Rosenberg ................... 705/26 |
| 6,404,337 | B1 | * | 6/2002 | Van Till et al. ............. 340/569 |
| 6,434,530 | B1 | * | 8/2002 | Sloane et al. ................... 705/1 |
| 6,625,580 | B1 | * | 9/2003 | Tayama ....................... 705/26 |
| 6,684,980 | B1 | | 2/2004 | Ungerford, III |
| 6,732,934 | B1 | * | 5/2004 | Hamilton et al. ...... 235/472.01 |
| 6,882,269 | B1 | * | 4/2005 | Moreno ...................... 340/5.73 |
| 2001/0032443 | A1 | | 10/2001 | Tiley et al. |
| 2002/0016747 | A1 | | 2/2002 | Razumov |
| 2002/0035515 | A1 | | 3/2002 | Moreno |

FOREIGN PATENT DOCUMENTS

| EP | 0856812 | 5/1998 |
| WO | WO03/056490 | 7/2003 |

\* cited by examiner

*Primary Examiner*—Ahshik Kim
(74) *Attorney, Agent, or Firm*—Gene Scott, Patent Law & Venture Group

(57) ABSTRACT

A shopping method comprises the steps of displaying a line of merchandise within a retail establishment; training sales assistants to operate portable sales checkout devices and to match the line of merchandise with shoppers' needs; recording purchases and simultaneously producing and delivering a paper sales receipt and a paper pickup voucher to each of the shoppers wherein, the pickup voucher identifies a pickup point access code, pickup point identity and pickup point compartment identity; reserving the pickup point compartment associated with the compartment identity; wrapping and marking the purchases with a pickup point access code, pickup point identity and pickup point compartment identity; delivering the purchases to the pickup compartments and enabling the pickup vouchers of the shoppers to provide access to the respective pickup compartments.

9 Claims, 4 Drawing Sheets

BURDEN FREE SHOPPING

BACKGROUND OF THE INVENTION

1. Field of the Invention

This invention relates generally to commercial retail methods and more particularly to a shopping method offering great convenience to shoppers.

2. Description of Related Art

The following art defines the present state of this field and each disclosure is hereby incorporated herein by reference:

Bianco, U.S. Pat. No. 5,047,614: Describes a method and means to aid shopping which includes the use by a consumer of a portable bar code scanner having an electronic memory. The consumer enters desired items into the memory by scanning bar codes on, for example, containers, coupons, advertisements, and pamphlets furnished by a store. The memory is then read by a store terminal which may compile a printed shopping list and/or may transmit the order to a warehouse environment for manual and/or automatic order picking. The memory may be read by the store terminal over a telephone line via a modem.

Wolfram, U.S. Pat. No. 5,051,565: Describes a system and method for matching all loaded baggage with passengers during aircraft boarding to provide each passenger with a boarding pass and baggage tags, each having the same unique machine readable code imprinted thereon. A scanner and memory device at the boarding point scans and reads a passenger's pass and stores the code. A portable scanner and memory at the baggage loading point scans and reads each luggage tag and stores each code. The stored codes are delivered to the passenger loading gate prior to departure of the aircraft. A computer compares stored passenger codes with stored baggage codes. Lack of a stored loading pass code with a matching stored code of loaded baggage is indicated to permit inspection of such baggage prior to aircraft departure.

Schneider, U.S. Pat. No. 5,165,961: Describes a system and method for dispensing a viscous adhesive onto a glass member to be attached to a vehicle body. A reciprocating pump supplies adhesive to a dispensing point, with a pulse dampener member disposed between the pump and the dispensing point. A rolling diaphragm defines two chambers within the pulse dampener member, with the adhesive being communicated into a first variable volume chamber. A pressurized gas force is maintained on the opposite side of the diaphragm from the first variable volume chamber. The pulse dampener member includes a T-connection, with the pump supplying fluid into a first leg, the second leg being connected to the variable volume chamber and the third leg connected to the dispensing point. As fluid enters the first leg, the amount of fluid demanded at the dispensing point moves from the first leg directly into the third leg. Any excess fluid supplied into the first leg moves upwardly into the variable volume chamber through the second leg. Should there be a deficiency in the amount of adhesive supplied by the pump, as would typically occur during low flow rate portions of the cycle of the reciprocating pump, the force from the pressurized gas chamber forces the rolling diaphragm to reduce the volume of the variable volume chamber and dispense fluid stored in the variable volume chamber into the third leg. A rotary valve is mounted at the dispensing point to provide accurate and rapid control of the amount of fluid dispensed. Most preferably, the rotary valve is mounted to a robot arm, and the pulse dampener member is mounted to a base of the robot.

Trotta, Jr., U.S. Pat. No. 5,595,264: Describes a system and method of automated shopping, including a portable bar code scanner for scanning bar code indicia information on items selected to be purchased, securing the scanner in a holder for limited access, and releasing the portable bar code scanner upon receiving an authorized payment card. A plurality of items for purchase are displayed in a store such that a customer can select an item to be purchased from the store display. The customer scans the bar code indicia on the selected item from the store display. The payment card is debited for the purchase price of the selected item and then returned to the customer.

Campo et al., U.S. Pat. No. 5,408,077: Describes a point of sale terminal that as disclosed provides all of the usual point of sale terminal functions, but that is entirely field portable. Data pertinent to each purchase can be input to the terminal via a keyboard assembly, a touch-screen display or a signature-capture screen assembly, or via an antenna and radio link from an associated bar code scanner. Data may be communicated at any time to a remote host computer, also via a separate antenna and radio link. The communication links with the host computer and the bar code scanner operate independently and simultaneously, using mutually compatible modulation schemes such as a spread spectrum scheme for the host computer link and a narrowband or spread spectrum scheme for the bar code scanner link. The terminal thereby functions as a portable repeater or node in a data communications network.

Tiley et al., U.S. 2001/0032443: Describes a method for package storage and retrieval by providing within a retail outlet, a receptacle with a compartment capable of receiving, retaining and releasing at least one package deposited by a sender for pick-up by a recipient thereby beginning a transaction. A sender is provided access to the receptacle for a recipient. A recipient is provided access to the receptacle to retrieve the package and thereby completing a transaction such that the compartment may be used for another transaction.

Razumov, U.S. 2002/0016747: Describes a novel retail system that is provided with an advance ordering system that enables a customer to order a purchase in advance. At least one storage facility is arranged for storing goods available for ordering. Multiple retail facilities remote with respect to the storage facility enable a customer to obtain the ordered purchase after a time period sufficient to deliver the ordered purchase from the storage facility to a retail facility selected by the customer. At least one of the retail facilities has a drive-through check-out arrangement that enables a customer sitting in a vehicle to pick up the ordered purchase without leaving the vehicle.

Moreno, U.S. 2002/0035515: Describes a system and process for securing goods delivered to and retrieved from a secure storage unit. The system utilizes a locker having an interior into which at least one good may be inserted and secured by a door via a locking mechanism. Access to the interior of the locker is controlled by a server which is in communication with the locker via an Internet or other network connection. The server controls the accessing and operation of the locker either directly or in combination with a controller. The controller is suitably situated in a kiosk that provides user interfaces by which customers, vendors, and/or carriers access and utilize the locker. The locker may be any suitable storage container including garages, mailboxes, heated/cooled compartments, and other storage units. The kiosk may also include other vending machines and dispensing devices, the operation of which are preferably controlled by the server.

Hungerford, III, U.S. Pat. No. 6,684,980: Describes a package and delivery system method and display to be used in a retail business environment where customers choose to purchase an item represented by a displayed example. The delivery is handled through a central facility and a post card is used by the purchaser to notify the recipient of the impending receipt of the purchased item. The invention allows for a retailer to operate in essentially an inventory free environment. Graphic designs included on the postcard may be limited edition prints. It is emphasized that this abstract is provided to comply with the rules requiring an abstract that will allow a searcher or other reader to quickly ascertain the subject matter of the technical disclosure. It is submitted with the understanding that it will not be used to interpret or limit the scope of meaning of the claims.

Beach, E.P. 0856812: Describes an invention that relates to an improved order fulfillment system. The system is provided with improved data entry system for selecting items for purchase by a customer, and an improved item collection terminal and order delivery system.

The portable terminal to be used for collecting of items is provided with an audio as well as a video presentation means which are used to provide assistance to the to terminal user.

Accenture Global Services GMBH, W.O. 056490: Describes a method and system for the delivery of goods. Remote locker banks are used to distribute parcels of previously requested goods to a field operative. The field operative requests via a computer one or more goods from a distribution center, which packages the goods into a parcel and transports the parcel to a locker in a locker bank at a location nearest to the field operative. The distribution center and remote locker banks are connected via a central server computer that facilities communications and operations among them. The distribution center also communicates locker information to a field operative's remote unit, such that the field operative can open the specified locker when he or she goes to retrieve the parcel. The remote locker banks may be placed near retail stores or service stations, where spillover parcels may be stored when the locker bank is full.

Our prior art search described above teaches: a portable point of sale terminal, a baggage and passenger matching method and system, a method and apparatus for computer-aided shopping, a system and method for automated shopping, a supermarket with self-service checkout, minimal inventory package and delivery system in a retail business environment, a retail system with drive-through check-out arrangement, a method of providing an automated package receptacle for the receipt, storage and pickup of a package at a retail site and for providing marketing and other communications to package recipients, a delivery of goods to electronic storage lockers, a portable shopping and order fulfillment system, a system and method for remotely coordinating the secure delivery of goods. Thus, the prior art shows, various techniques for automating shopping and for separating the purchasing and the merchandise pickup functions. However, the prior art fails to teach the use of sales assistance personnel trained in both sales assistance as well as sales checkout, and fails to teach a method of shopping wherein plural purchases from plural sales venues may be combined into a single merchandise pickup procedure. The prior art also fails to address the reserving of a pickup compartment at the moment of the purchase. The present invention fulfills these needs and provides further related advantages as described in the following summary.

SUMMARY OF THE INVENTION

The present invention teaches certain benefits in construction and use which give rise to the objectives described below.

In the best mode preferred embodiment of the present invention, a shopping method comprises the steps of displaying a line of merchandise within a retail establishment; training sales assistants to operate portable sales checkout devices and to match the line of merchandise with shoppers' needs; recording purchases and simultaneously producing and delivering a paper sales receipt and a paper pickup voucher to each of the shoppers wherein, the pickup voucher identifies a pickup point access code, pickup point identity and pickup point compartment identity; reserving the pickup point compartment associated with the compartment identity; wrapping and marking the purchases with a pickup point access code, pickup point identity and pickup point compartment identity; delivering the purchases to the pickup compartments and enabling the pickup vouchers of the shoppers to provide access to the respective pickup compartments.

In the present shopping method the steps include displaying merchandise in one or more retail selling establishments such as those that display and sell consumer goods, but the present method is not limited thereto and may include commercial goods and industrial goods as well. Examples of retail sales establishments include Walmart, K-Mart, Sears, Penney's; Target and others including department stores, specialty stores, discount stores and stores of all kinds in shopping and strip malls, referred to herein as community shopping centers.

The present method includes the step of training a workforce of sales assistants to each operate a portable sales checkout device, Such checkout devices may be carried on the person of a sales assistant and may be made small enough to be carried in a pocket for instance. A further step includes the training of the same sales assistants to help shoppers in selecting purchases. It is considered unnecessary and expensive to cross-train sales personnel on checkout and vice-versa. However, the elimination of checkout stands, long checkout lines and other drawbacks of separate checkout systems may be completely eliminated using the present invention method. Furthermore, by combining the retail floor skills of know-how or immediate electronic acquisition of detail product information, inventory availability, store location information, alternate source information, sales checkout skills, and general salesmanship, it is possible to meet the complex and varying needs of a wide range of shoppers in a more convenient and satisfying manner then is presently possible.

A primary objective of the present invention is to provide an apparatus and method of use of such apparatus that yields advantages not taught by the prior art.

Another objective of the invention is to enable shoppers to continue shopping without being encumbered by carrying packages.

A further objective of the invention is to enable the shoppers to pick up all purchases at one time at one location.

A still further objective of the invention is enable shoppers to shop without standing on checkout lines.

A yet still further objective of the invention is to enable shoppers to deal with only one person within each retail establishment, so as to develop a relationship with the one person similar to that of a personal shopping assistant.

A still further objective of the invention is to enable shoppers to select merchandise, pay for the merchandise, and then pickup the merchandise at a later time without encountering any sales or support personnel.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings.

DETAILED DESCRIPTION OF THE INVENTION

Figure 1:
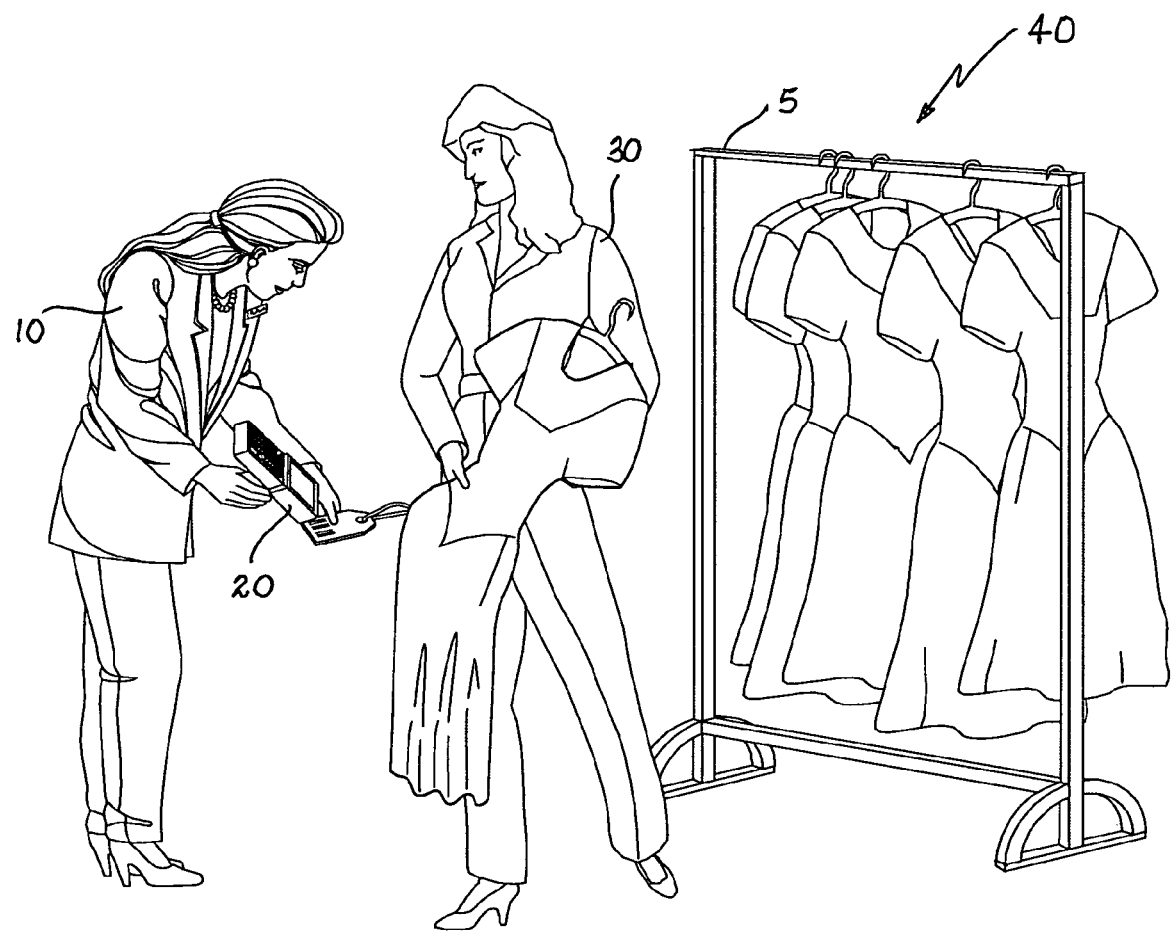
FIG. 1 is a perspective view of a shopper selecting merchandise within a retail establishment and of the selected merchandise being purchased using a portable checkout device.

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

The shopping method of the present invention includes certain steps which are taken in sequence. First, lines of merchandise are displayed (FIG. 1) within at least one, but preferably, a plurality of retail establishments within a shopping community, such as a shopping mall, a strip mall, or a local shopping district. It should be understood that the present method will operate to satisfaction for a single retail store, but it is particularly beneficial when plural stores, handling a full range of merchandise are included. Sales assistants 10, such as so-called floor sales associates by some stores, are trained to operate portable sales checkout devices 20 (FIG. 1), for instance, of the type described in Campo et al, U.S. Pat. No. 5,408,077 which is hereby made a part of this specification by reference. Typically, floor sales personnel 10 are trained in merchandise knowledge, salesmanship, interpersonal communication skills and the like, but are not cross trained to provide sales registration and checkout services. The later services are normally handled by checkout clerks 15 (FIG. 2) who are not also trained in salesmanship and customer satisfaction skills. Thus, to provide a retail establishment with no checkout stands, cash registers, checkout lines and the like is considered to be a novel feature of the present invention. Alternatively, as shown in FIG. 2, a retail store may operate in a hybrid manner using both sales assistants 10 using portable sales checkout devices 20 and cash register checkout stands so as to accommodate the preferences of shoppers 30.

Figure 2:
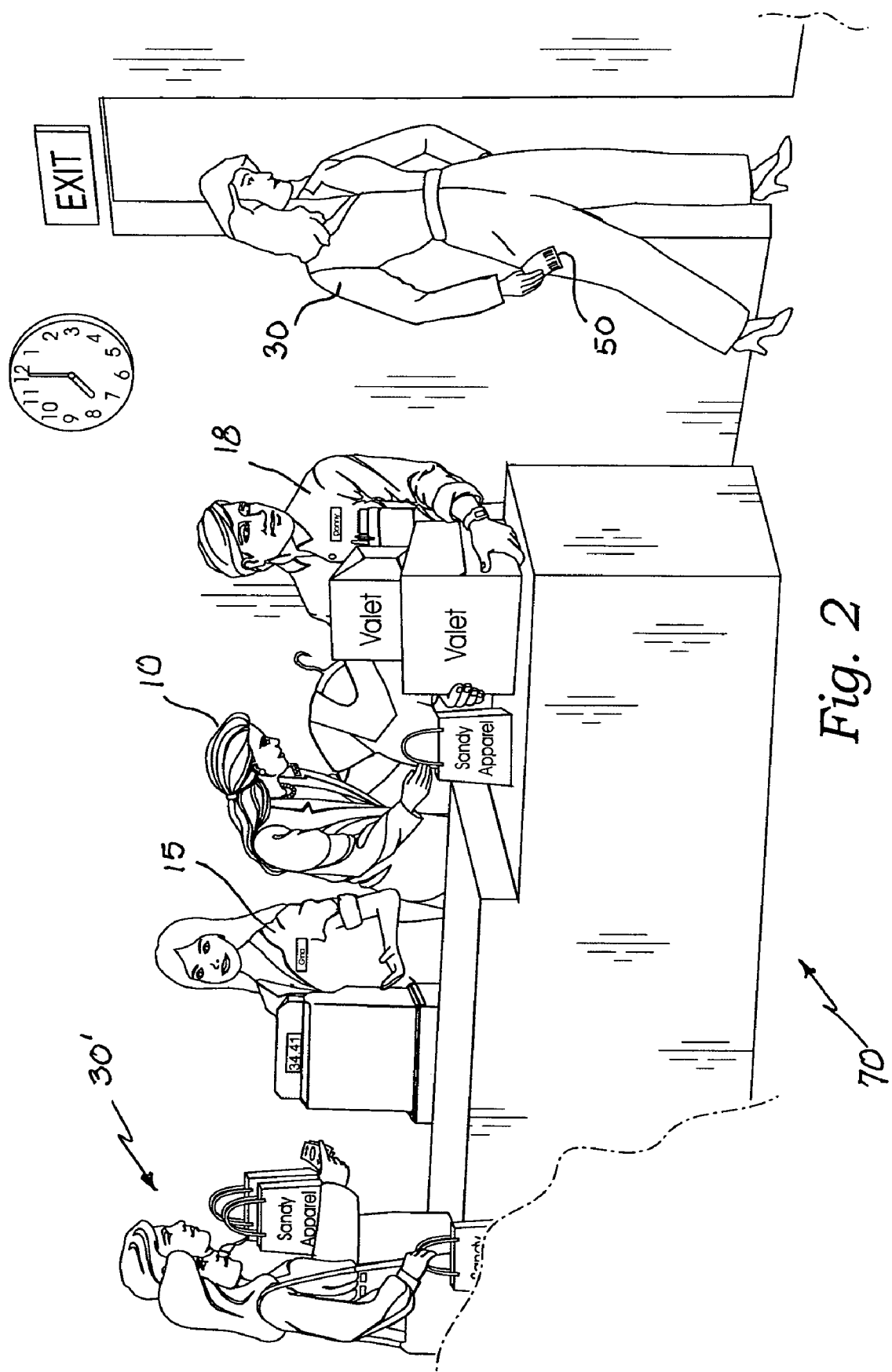
FIG. 2 is a perspective view of the shopper leaving the retail establishment while her purchases are wrapped and tagged.

The sales assistants 10 are therefore trained to match at least one of the lines of merchandise with shoppers' needs in a one-on-one sales relationships within at least one of the retail establishments (FIG. 1). To accomplish this, the sales assistants are placed on the sales floor to mingle with and approach shoppers 30 within the retail establishments so as to produce purchases by the shoppers 30 from the lines of merchandise 40. When such purchases are indicated by the shoppers 30, the checkout devices 20 are used to record them and simultaneously, for each of the purchases, to produce and deliver a combination paper sales receipt and pickup voucher 50, to each of the shoppers 30 (FIG. 2). The voucher 50 indicates a pickup point identity, selected by the shopper 30, an access code, and a pickup point compartment identity. Immediately, the pickup point compartment 60 where the merchandise will be picked up is reserved by computer derived data communication between the checkout device 20 and a reservation device 65 interconnected with the pickup point compartments 60.

Immediately after a purchase, the shoppers 30 are free to continue shopping within the retail establishment and to make further purchases, or they may immediately exit the retail establishments (FIG. 2), and need take only the voucher 50. FIG. 2 is not meant to indicate that the shopper 30 has taken her purchases to the checkout desk 70, but only that she is free to exit. After each purchase, the shopper 30 is free to continue shopping for more merchandise within the same store or to go to another store. The shopper 30 is also free to go to a gift wrap desk (not shown) to select a wrapping material and style. Here also, the shopper 30, under the present method, does not carry the merchandise to the gift wrap desk. In all cases, the purchases are moved either by the sales assistant 10, or by service personnel 18. The present method is a valet shopping method which includes the carrying of merchandise by employees 19, 18 of the establishment rather than by the shopper 30. Clearly, in conventional shopping, the shopper 30 must stop shopping when it becomes inconvenient to carry further merchandise. Shopping carts provided by the retail establishment, as in supermarkets, or by the shopper, provide the benefit of enabling the shopper to carry more merchandise. In the present method, this carry limit drawback is completely eliminated. The present shopping method allows the shopper 30 to purchase as much merchandise as they can carry in their automobile or truck.

A copy of the sales receipt/pickup voucher 50 is stored in the checkout device 20 electronically.

Immediately upon completion of the purchase, the sales assistant 10 (not the shopper) moves the purchased merchandise to a wrapping point 70 (FIG. 2), typically within the retail establishment, but not necessarily on the sales floor, i.e., it may preferably be located in the storage or warehousing portions of the store, or in a nearby facility. Here, the merchandise is wrapped and marked with the pickup point access code, pickup point identity or location, and the pickup point compartment identity. To enable this scheme to work, the pickup point(s) have a computerized compartment reservation protocol software enablement and are in data transfer communication with the checkout devices 20, or with store computers, which are in-turn in communication with the checkout devices 20. This type of communication network is well known and, in this case provides instant reservation of a checkout point compartment 60 at the time of purchase so that the shopper 30 may proceed immediately to the checkout point without having to carry heavy merchandise, or, as is generally the case, the shopper 30 will continue shopping, stop at a personal services venue, such as for hair or nail grooming, stop to eat and or drink, and perhaps stop at a recreational venue such as a motion picture theater or an arcade game venue and then visit the checkout point prior to leaving the shopping community. In the case of just a single store offering the method of this invention, the pickup point may be contiguous with the store as is well known for those stores in today's marketplace that have a pickup desk or loading dock external to the shopping portion of the store.

Figure 3:
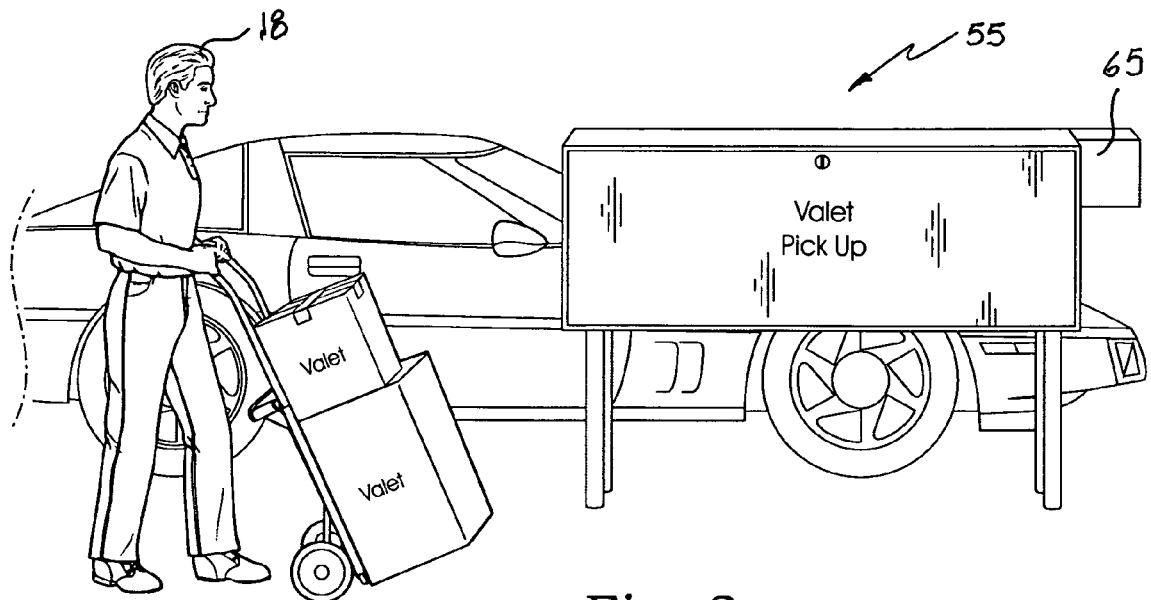
FIG. 3 is a perspective view of the purchases of plural shoppers being taken to a pickup point.
Figure 4:
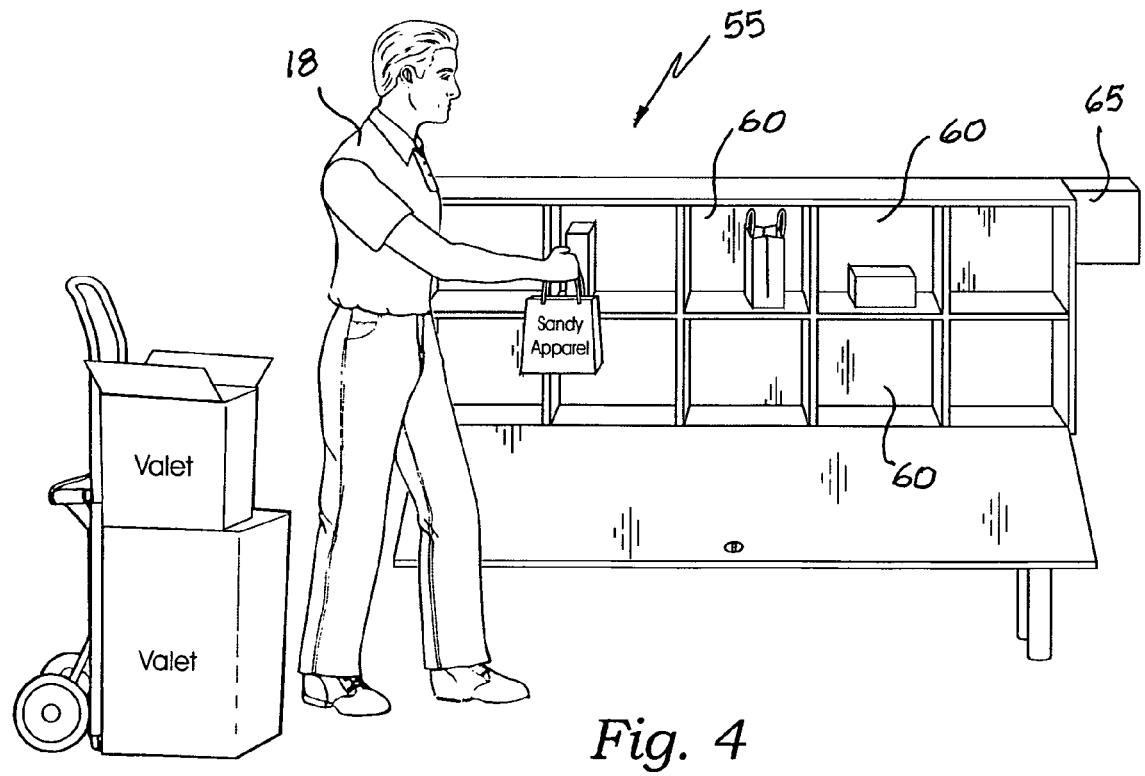
FIG. 4 is a perspective view of the shopper's purchases being placed into a compartment at the pickup point.

Next, as shown in FIGS. 3 and 4, the wrapped purchases are moved to the designated pickup point 55, and secured within the reserved pickup compartment 60 which is typically located externally to the retail establishment. When the shopper 30 is ready to receive the merchandise, the shopper 30 moves to the pickup point and uses the pickup voucher 50 to gain access to the reserved pickup compartment 60 (FIG. 5) and then removes the wrapped purchases from the pickup compartment 60 (FIG. 6) and is able to transport the purchased merchandise in an automobile or truck.

Figure 5:
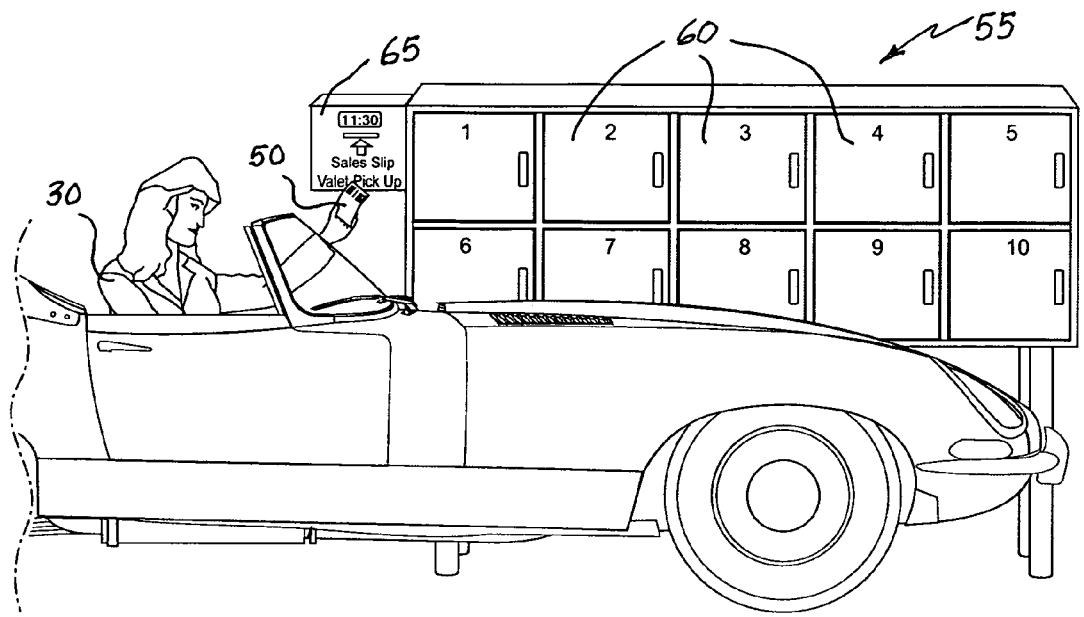
FIG. 5 is a perspective view of the shopper using a pickup voucher to access the compartment.
Figure 6:
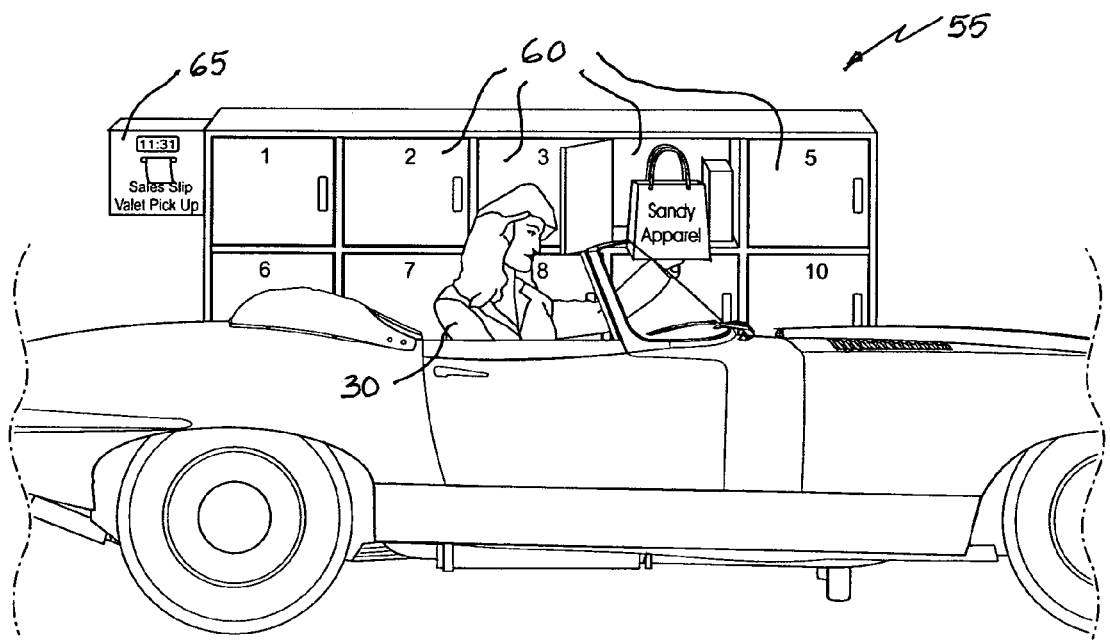
FIG. 6 is a perspective view of the shopper retrieving the purchased merchandise.

In one embodiment, payment for the purchases is made to the sales assistant 10 at the time of recording the purchases, as shown in FIG. 1, and may be by credit card, check or cash. In an alternate embodiment, as shown in FIG. 5, payment may be made at the pickup point 55 using a credit or debit card in an automated teller device similar to a bank automated teller machine, which then enables access to the respective pickup compartment 60.

When a shopper 30 makes plural purchases in a single retail store or in more than one retail store, the shopper 30 presents the first pickup voucher 50 to the later sales assistants 10 so that the pickup point 55 and pickup compartment 60 assigned during the first purchase is recorded for later purchases so that all of the purchases are placed within the same compartment 60 if possible. If not enough space is available in a given compartment 60, plural compartments are reserved and used.

To facilitate the use of checkout points 55 and reserved compartments 60, voucher readers may be located within the retail establishments and/or on the grounds of the shopping community. Such readers will accept a voucher 50 and provide a summary readout on, for instance, an LCD monitor screen, showing the purchases that were made up until the present time, the amounts paid and even, perhaps, the amount remaining in a debit card account or within the money card used, and the location of the pickup point 55, compartment 60 and time when the compartment must be vacated.

In a busy shopping center environment, clearly, when the method of the present invention is fully employed for thousands of shoppers, it will no doubt be necessary to charge shoppers for the value added and convenience of not having to carry purchases around during a shopping trip. Space in pickup points may become highly sought so that space may have to carry a charge, possibly by the hour for the use of such storage facilities and the services associated therewith. When a shopper does not vacate a pickup compartment at the pre-scheduled time, for instance, to make room for the next scheduled shopper, the compartment 60 may have to be vacated by service personnel 18 and a late charge levied. If the compartments 60 are rented by the hour the rental fee can be included in the purchase and paid at point of sale, the voucher 50 reflecting same.

In an alternate embodiment of the present method, the checkout device 20 is mounted adjacently to the locations of merchandise within the store. For instance, in FIG. 1 the checkout device 20 could be mounted onto the clothing rack 5. In this scenario, the shopper 30 selects the item of merchandise desired, and after possibly trying it on for size and deciding on purchasing it, the shopper herself scans the attached merchandise label under the checkout device 20, scans a credit or debit card through the checkout device 20 and receives the combination sales receipt and pickup voucher 50 which is printed out from the checkout device 20. If reservation of a pickup point compartment 60 is desired, the shopper will enter the earliest pickup time desired and the checkout device will identify the latest time the merchandise can be picked up, usually based upon current demand. The shopper then places the purchased merchandise on a pickup rack or the equivalent thereof for later pickup by service personnel 18 who then move it to the shopper selected pickup point 55. Clearly, this embodiment eliminates the need for the sales assistant 10 entirely while still providing the bulk of the advantages of the present method.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A shopping method comprising the steps of:
    placing sales assistants having portable checkout devices with shoppers within a retail establishment so as to produce purchases by the shoppers from a line of merchandise;
    using the portable checkout devices to record the purchases of the shoppers and simultaneously, for each of the purchases, to produce a combination paper sales receipt and pickup voucher providing a pickup point access code, pickup point identity external to the retail establishment, and pickup point compartment identity;
    reserving the pickup point compartments associated with the compartment identities at the same time as the purchases;
    moving the purchases to a wrapping point associated with the retail establishment;
    wrapping and marking the purchases with the pickup point access codes, pickup point identities and pickup point compartment identities;
    delivering and securing the wrapped purchases within the reserved pickup compartments at the pickup points; and
    enabling the combination sales receipt and pickup vouchers of the shoppers to provide access to the respective pickup compartments.

2. The method of claim 1 wherein payment for the purchases is made to a sales assistant at the time of recording the purchases.

3. The method of claim 1 wherein payment for at least one of the purchases is made at the pickup point prior to enabling access by the corresponding shoppers to respective pickup compartments.

4. A shopping method comprising the steps of:
    displaying lines of merchandise within at least one retail establishments;
    placement of sales checkout devices at locations within the retail establishment for use of shoppers;
    entering merchandise information, pickup point identity and estimated pickup time into the checkout device by the shopper;
    entering payment into the checkout device by the shopper;
    automatically printing in the checkout device, and delivering from the checkout device to the shopper, a combination sales receipt and pickup voucher indicating item purchased, amount paid, access code, pickup point location, pickup point compartment reserved and expiration time of the compartment reservation;
    reserving the pickup point compartment associated with the voucher;
    placing the purchased merchandise so as to be identified for pickup and transfer to the pickup point compartment;
    moving the purchases to a wrapping paint by retail store personnel;
    wrapping and marking the purchases with pickup point access code, pickup point identity and pickup point compartment identity;
    delivering and securing the wrapped purchase within the identified pickup compartment;
    enabling the pickup voucher of the shoppers to provide access to the respective pickup compartments;
    removing the corresponding wrapped purchases from the respective pickup compartment by the shopper.

5. The method of claim 4 wherein payment for the purchases is made to a sales assistant at the time of recording the purchases.

6. The method of claim 4 wherein payment for at least one of the purchases is made at the pickup point prior to enabling access by the corresponding shoppers to respective pickup compartments.

7. A shopping method comprising the steps of:
    displaying lines of merchandise within a plurality of retail establishments within a shopping community;
    training sales assistants to operate portable sales checkout devices;
    training the sales assistants to match at least one of the lines of merchandise with shoppers' needs in one-on-one sales relationships within at least one of the retail establishments;
    placing the sales assistants with the shoppers within the retail establishments so as to produce purchases by the shoppers from the lines of merchandise;
    using the checkout devices to record the purchases of the shoppers and simultaneously, for each of die purchases, to produce and deliver a paper sales receipt and a paper pickup voucher to each or the shoppers making the purchases, the pickup voucher for each one of the shoppers providing a pickup point access code, pickup point identity and pickup point compartment identity;
    reserving the pickup point compartment associated with the compartment identify;
    dismissing the shoppers immediately after the purchases so that tho shoppers may exit the at least one of the retail establishments;
    storing a copy of the sales receipts and the pickup vouchers in the checkout devices;
    moving the purchases to a wrapping point;
    wrapping and marking the purchases with pickup point access code, pickup point identity and pickup paint compartment identity;
    delivering and securing the wrapped purchases within pickup compartments at a shopper selected one of a plurality of pickup points eternal to the retail establishments;
    enabling the pickup vouches of the shoppers to provide access to the respective pickup compartments;
    removing the corresponding wrapped purchases from the respective pickup compartments by the shoppers.

8. The method of claim 7 wherein payment for the purchases is made to a sales assistant at the time of recording the purchases.

9. The method of claim 7 wherein payment for at least one of the purchases is made at the pickup paint prior to enabling access by the corresponding shoppers to respective pickup compartments.

* * * * *